United States Patent
Lin et al.

(10) Patent No.: US 9,304,616 B2
(45) Date of Patent: Apr. 5, 2016

(54) TOUCH PANEL WITH DIVERSIFIED COLOR IN A CONDUCTING WIRE REGION

(71) Applicant: TPK TOUCH SOLUTIONS (XIAMEN) INC., Xiamen (CN)

(72) Inventors: Ching-Shan Lin, Kaohsiung (TW); Yu-Jen Chen, Tainan (TW); Lichun Yang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 340 days.

(21) Appl. No.: 13/855,739

(22) Filed: Apr. 3, 2013

(65) Prior Publication Data

US 2013/0265253 A1  Oct. 10, 2013

(30) Foreign Application Priority Data

Apr. 6, 2012  (CN) .......................... 2012 1 0098717

(51) Int. Cl.
*G06F 3/041* (2006.01)
(52) U.S. Cl.
CPC ..................................... *G06F 3/041* (2013.01)
(58) Field of Classification Search
CPC ............................... G06F 3/041; G06F 3/0481
See application file for complete search history.

(56) References Cited

U.S. PATENT DOCUMENTS

| | | | |
|---|---|---|---|
| 2011/0012842 A1* | 1/2011 | Lee et al. ........................ | 345/173 |
| 2011/0074729 A1* | 3/2011 | Im et al. ......................... | 345/174 |
| 2012/0050190 A1* | 3/2012 | Lai et al. ........................ | 345/173 |

FOREIGN PATENT DOCUMENTS

| | | |
|---|---|---|
| CN | 201312451 Y | 9/2009 |
| CN | 101920585 A | 12/2010 |

* cited by examiner

*Primary Examiner* — Koosha Sharifi-Tafreshi
*Assistant Examiner* — Chun-Nan Lin
(74) *Attorney, Agent, or Firm* — Gokalp Bayramoglu

(57) ABSTRACT

The present disclosure provides a touch panel including a plate, a sensing layer, a border, and an optical compensation layer, wherein the plate has an upper surface and a lower surface opposite to the upper surface, wherein the lower surface is planned with a conducting wire region and a sensing region. The border is overlaid on the conducting wire region, and the sensing layer is disposed in the sensing region. An optical compensation layer is disposed on the border, and is located between the plate and the border. The border has a first color, which appears as a second color if a user sees the border through the optical compensation layer, and thus achieves diversification of the border color.

30 Claims, 5 Drawing Sheets

TOUCH PANEL WITH DIVERSIFIED COLOR IN A CONDUCTING WIRE REGION

BACKGROUND OF THE INVENTION

This Application claims the benefit of the People's Republic of China Application No. 201210098717.5, filed on Apr. 6, 2012.

FIELD OF THE INVENTION

The present disclosure relates to a touch panel. More particularly, the present disclosure relates to a touch panel that can achieve a diversification of border color.

DESCRIPTION OF THE RELATED ART

At present, touch panels have been widely used in various consumer electronic devices. According to the sensing principles of touch panels, touch panels can be categorized into resistive, capacitive, optical, infrared, surface acoustic wave, and the like. A touch panel normally includes a substrate, a sensing layer, and conducting wires, wherein a touch region and a conducting wire region surrounding the touch region are laid on the substrate, the sensing layer is distributed in the touch region, and the conducting wires are distributed in the conducting wire region. In order to avoid users seeing the conducting wires, a shading border is generally overlaid on the conducting wires. For example, a black matrix can be formed on a lower surface of a cover glass of the touch panel to correspond to position of the conducting wires by a method of ink-printing. Alternatively, the border can be manufactured by coating a colored photo resist by a method of photo-etching.

Color of the border used for shading is generally a single black or rare white. If manufacturing the border with different colors is needed, then it is achieved by adding a pigment or dye into the ink or photo resist to adjust color of the ink or photo resist. The pigment and dye are not easily mixed thoroughly with the ink or photo resist. Additionally, some subsequent manufacturing processes are needed for higher manufacturing temperature. If a method of adding dye is adopted, it may cause defective products because the dye cannot withstand high temperature and is likely to discolor by heat.

SUMMARY OF THE INVENTION

In view of the above, the present disclosure provides a touch panel, which can achieve diversification of border color by disposing an optical compensation layer on the border.

According to the above objective, an embodiment of the present disclosure provides a touch panel including a plate, a border, a sensing layer and an optical compensation layer, wherein the plate has an upper surface and a lower surface planned with a conducting wire region and a sensing region. The border is overlaid on the conducting wire region, and the sensing layer is disposed in the sensing region. The optical compensation layer is disposed on the border and is located between the plate and the border.

According to the above objective, another embodiment of the present disclosure provides a touch panel including a substrate, a plate, a border, a sensing layer and an optical compensation layer, wherein a conducting wire region and a sensing region are disposed on a surface of the substrate. The sensing layer is disposed in the sensing region and the border is overlaid on the conducting wire region. The plate has an upper surface and a lower surface opposite to the upper surface and corresponding to the user. The plate is overlaid on the border which is disposed with an optical compensation layer, and the optical compensation layer is located between the plate and the border.

The present disclosure utilizes the optical compensation layer to adjust color of the border. In a situation of unchanging color of the ink or photo resist, color of the border is adjusted through a structure of the optical compensation layer. Since color of the ink or photo resist can be unchanged, higher manufacturing temperature of the subsequent manufacturing process would not cause defective products due to discoloration of dye by heat, which can increase the production yield. Moreover, the optical compensation layer can make the border appear different colors, so as to improve appearance of the touch panel.

DETAILED DESCRIPTION OF THE EMBODIMENTS

Figure 1A:
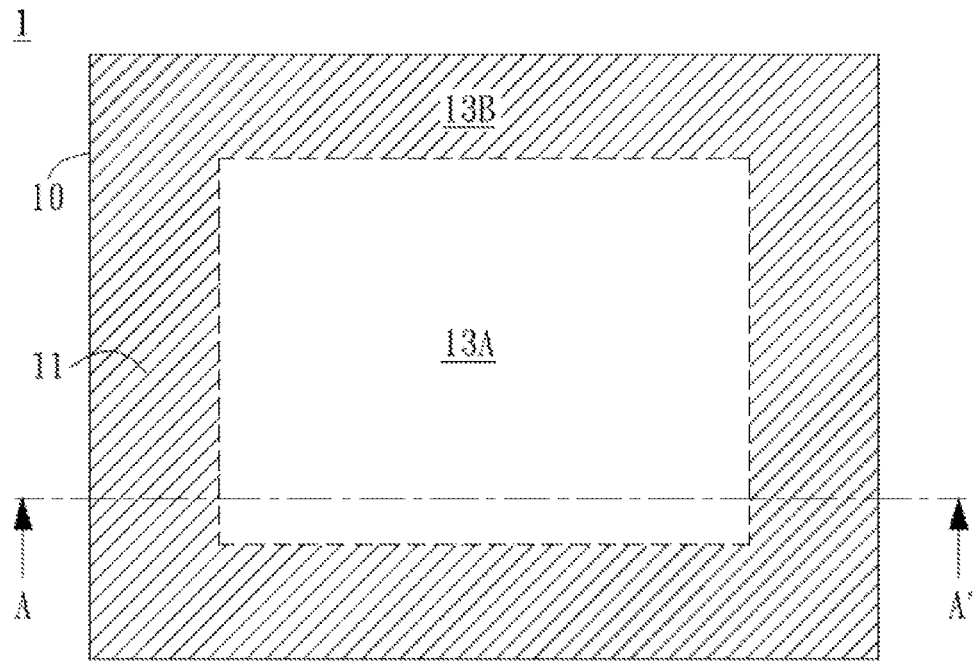
FIG. 1A-FIG. 1C illustrates a schematic top view and schematic sectional views of a touch panel in accordance with a first embodiment of the present disclosure.

Several embodiments of the present disclosure accompanied with drawings are described in details below. Except for these detailed descriptions, the present disclosure can be also widely applied in other embodiments, and any replacement, modification and equivalent changes of said embodiments are within the scope of the present disclosure, and are defined by the attached claims. In the description of the specification, in order to make the present disclosure more comprehensive to readers, many specific details are provided. However, the present disclosure may still be implemented on the premise of omitting a part or all of these specific details. In addition, the known steps or components are not described in the description to avoid causing unnecessary limitation to the present disclosure. Same or similar components in the drawings are indicated by same or similar symbols. It is to be noted that, the drawings are for the purpose of understanding only, and are not for presenting actual size or quantity of the components unless specifically stated otherwise.

Figure 1B:
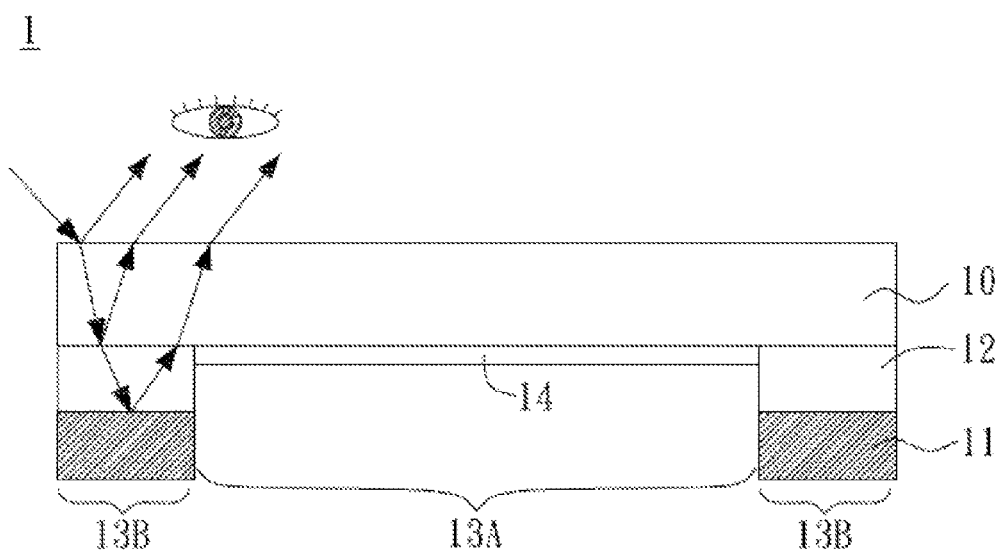

FIG. 1A and FIG. 1B illustrate a touch panel in accordance with a first embodiment of the present disclosure, wherein FIG. 1A is a top view and FIG. 1B is a sectional view, both of which only show important components to emphasize characteristics of the present disclosure. As shown in the FIGS. 1A and 1B, important components of a touch panel 1 include a plate 10, a border 11, a sensing layer 14, and an optical compensation layer 12. The plate 10 has an upper surface and a lower surface opposite to the upper surface and corresponding to users, wherein a sensing region 13A and a conducting wire region 13B are planned on the lower surface. The conducting wire region 13B surrounds the sensing region 13A. In other embodiments, the conducting wire region 13B can also be distributed on any two corresponding sides (not shown) of the sensing region 13A. The border 11 is overlaid on the conducting wire region 13B, and the sensing layer 14 is disposed in the sensing region 13A. An optical compensation layer 12 is disposed on the border 11, and is located between the plate 10 and the border 11. The border 11 has a first color, which looks as a second color if a user sees the border 11 through the optical compensation layer 12. In this embodiment, the border 11 can be formed by the traditional methods of ink printing, photo resist etching, or other methods known in the art.

When light irradiates the touch panel 1, a part of light reflects from the plate 10 to the user's eyes, and the rest of light penetrates through the plate 10 to the optical compensation layer 12. A part of light irradiating to the optical compensation layer 12 reflects to the user's eyes and has a certain reflection color. The rest of light penetrates to the border 11 and most of the light is reflected. The interference of the colored reflected light of the optical compensation layer 12 with the reflected light of the border 11 makes the entire reflection appear as a second color which is different from the color of the ink or the photo resist. This second color is different from color of the border 11, which helps achieve adjustment and change of color of the border 11.

In this embodiment, since the border 11 is formed by ink printing or photo resist etching, the first/initial color is normally black or white, but is not limited hereto. By adding an optical compensation layer 12, the whole structure formed by the border 11 and the optical compensation layer 12 appears to be made up of different colors.

The plate 10 can be a covering layer (such as a cover glass) for protecting each component of the touch panel 1, wherein upper surface of the plate 10 acts as a touch surface for users to touch, and lower surface of the plate 10 is disposed with the sensing layer 14 for detecting touch actions on the upper surface of the plate 10.

Figure 1C:
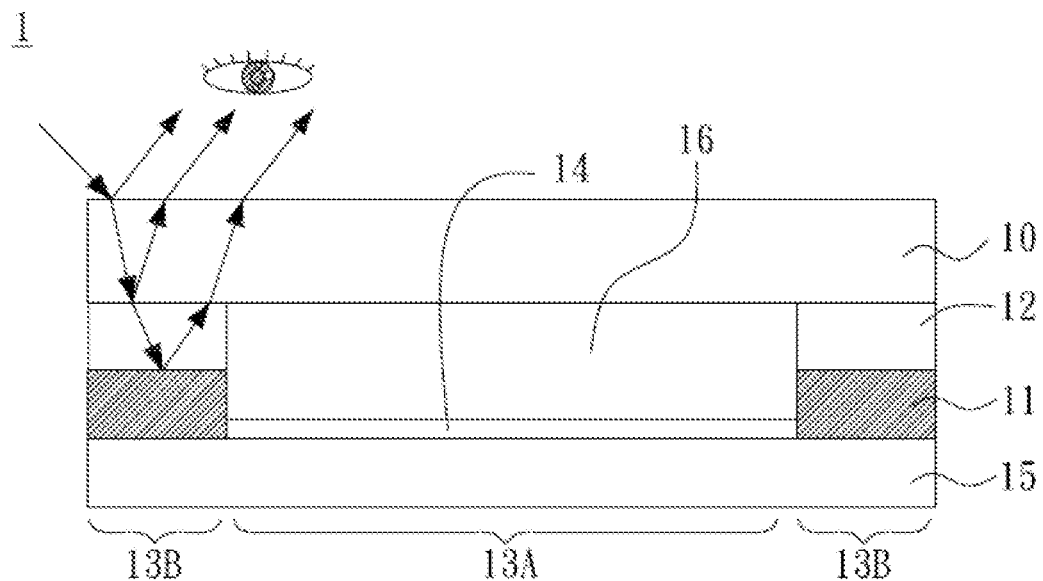

In another embodiment, sensing layer 14 is not formed on plate 10 as shown in FIG. 1C. In the embodiment of FIG. 1C, the touch panel 1 further includes a substrate 15, surface of which is disposed with a sensing area 13A and a conducting wire region 13B, wherein the conducting wire region 13B surrounds the sensing region 13A. In other embodiments, the conducting wire region 13B can also be distributed on any two corresponding sides (not shown) of the sensing region 13A. The sensing layer 14 is disposed on the sensing region 13A, and a border 11 is overlaid on the conducing wire region 13B. Moreover, the lower surface of the plate 10 covers (or faces) the border 11. An optical compensation layer 12 is disposed on the border 11 and is located between the plate 10 and the border 11. A smooth layer 16 is disposed between the plate 10 and the sensing layer 14. The border 11 has a first color, which looks as a second color if a user sees the border 11 through the optical compensation layer 12. The remaining details of this embodiment are the same as those of the embodiment of FIG. 1B.

The foregoing plate 10 and the substrate 15 can be both made of transparent materials such as, but not limited to, polyethyleneterephthalate (PET), glass, polycarbonate (PC), polymethylmethacrylate (PMMA) or other high polymer materials. The smooth layer 16 of the present disclosure can be made of materials such as, but not limited to, niobium pentoxide, titanium dioxide, zirconia or silica, and can also be made of an optical adhesive or any applicable material used for smoothing (or filling) the region between the sensing layer 14 and the plate 10.

Figure 2A:
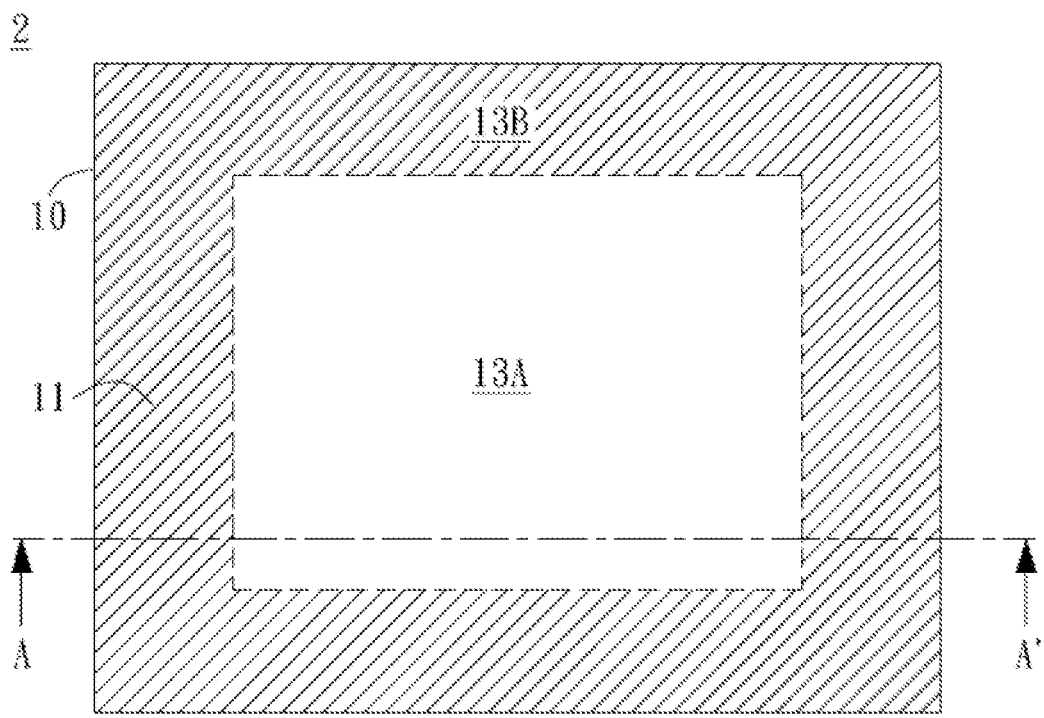
FIG. 2A-FIG. 2C illustrates a schematic top view and schematic sectional views of a touch panel in accordance with a second embodiment of the present disclosure.
Figure 2B:
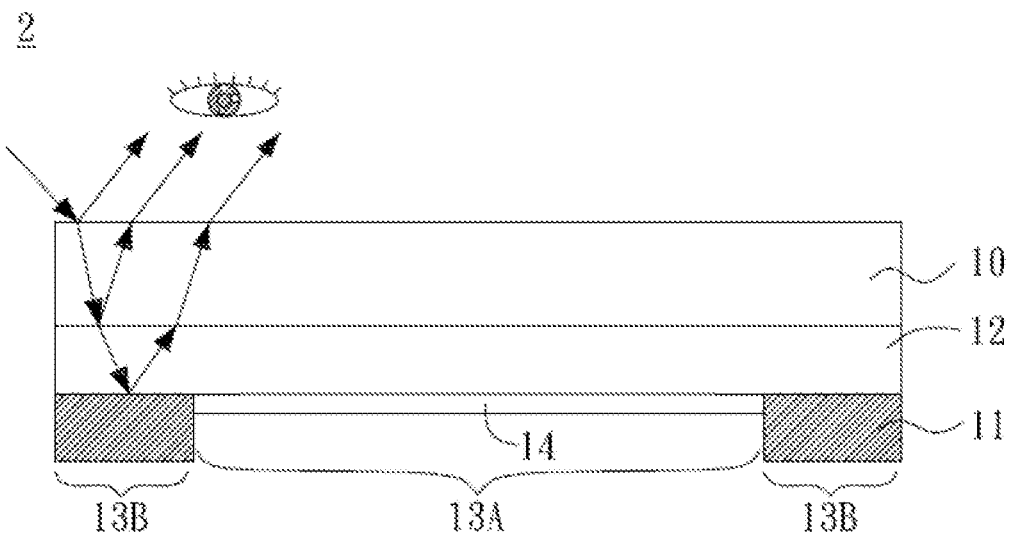

FIG. 2A and FIG. 2B illustrate a touch panel 2 in accordance with a second embodiment of the present disclosure, wherein FIG. 2A is a top view and FIG. 2B is a sectional view. As shown in the FIGS. 2A and 2B, the touch panel 2 and the touch panel 1 of FIG. 1 have same components and the only difference is that the optical compensation layer 12 of the touch panel 1 of FIG. 1B is disposed on the edge of the plate 10, and placed substantially corresponding to position of the border 11, while an optical compensation layer 12 of the touch panel 2 of FIG. 2B is substantially disposed on the entire surface of a plate 10, and a sensing layer 14 is formed on the lower surface of the optical compensation layer 12 to correspond to position of a sensing region 13A.

The sensing layer 14 is normally formed by patterning a transparent conductive material (such as ITO or the like), and includes a region covered with the conductive material and a region not covered with the conductive material, wherein refractive indexes of these two regions are different such that the sensing layer 14 appears with a certain visual difference in the touch panel, and appearance of the touch panel is affected. In this embodiment, the optical compensation layer 12 can not only adjust color of the border 11, but also dramatically reduce difference between the refractive indexes of the region covered with the conductive material and the region not covered with the conductive material on the sensing layer 14 of the sensing region 13A by choosing an applicable material and designing a reasonable structure so as to improve appearance of the touch panel 2. Additionally, the optical compensation layer 12 can also be used as an insulation layer of the sensing layer 14 for insulating and making the border appear with a variety of colors.

Figure 2C:
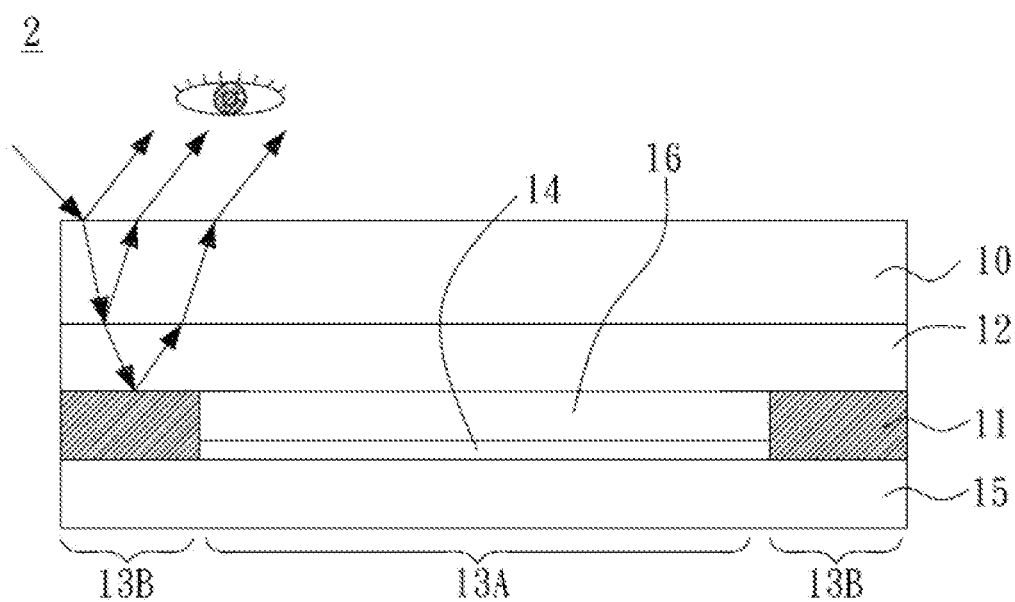

In another changed embodiment, sensing layer 14 is formed on other structures as shown in FIG. 2C. In the embodiment of FIG. 2C, the touch panel 2 further includes a substrate 15, surface of which is planned with a sensing region 13A and a conducting wire region 13B. The sensing layer 14 is disposed in the sensing region 13A and a border 11 is disposed in the conducting wire region 13B. Moreover, a lower surface of plate 10 covers for faces) the border 11. An optical compensation layer 12 is disposed on the border 11, and is located between the plate 10 and the border 11. A smooth layer 16 is disposed between the plate 10 and the sensing layer 14. The border 11 has a first color, which looks as a second color if a user sees the border 11 through the optical compensation layer 12. The remaining details are the same as those of the embodiment of FIG. 2B.

Figure 3A:
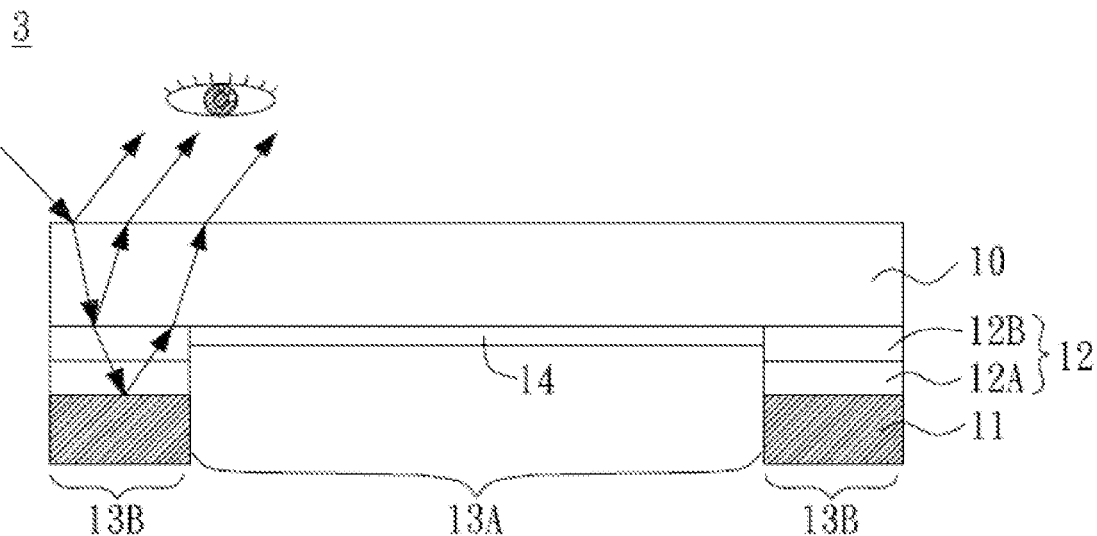
FIG. 3A illustrates a schematic sectional view of a touch panel in accordance with a third embodiment of the present disclosure.
Figure 3B:
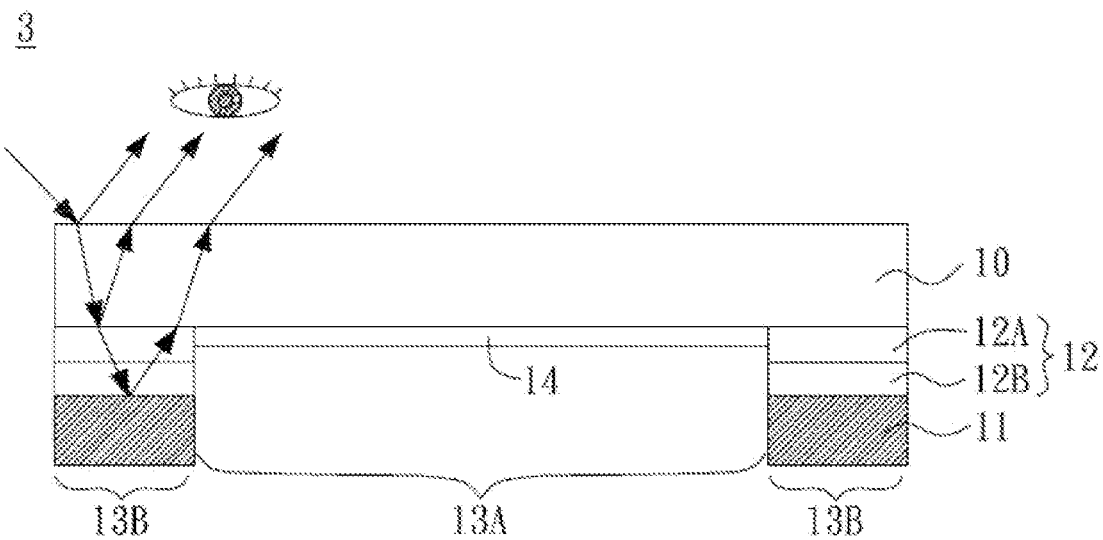
FIG. 3B and FIG. 3C are changed embodiments in accordance with the third embodiment of the present disclosure.

FIG. 3A illustrates a touch panel in accordance with a third embodiment of the present disclosure. In this embodiment, an optical compensation layer 12 includes one or a plurality of refractive index layers. Although this embodiment has been explained using the structure of FIG. 1A/B, the proposed structure can also be applied in the embodiment of FIG. 2A/B. In this embodiment, the optical compensation layer 12 includes a first refractive index layer 12A and a second refractive index layer 12B, wherein refractive index of the first refractive index layer 12A is less than that of the second refractive index layer 12B. As shown in FIG. 3B, in another embodiment, positions of the first refractive index layer 12A and the second refractive index layer 12B are swapped.

Figure 3C:
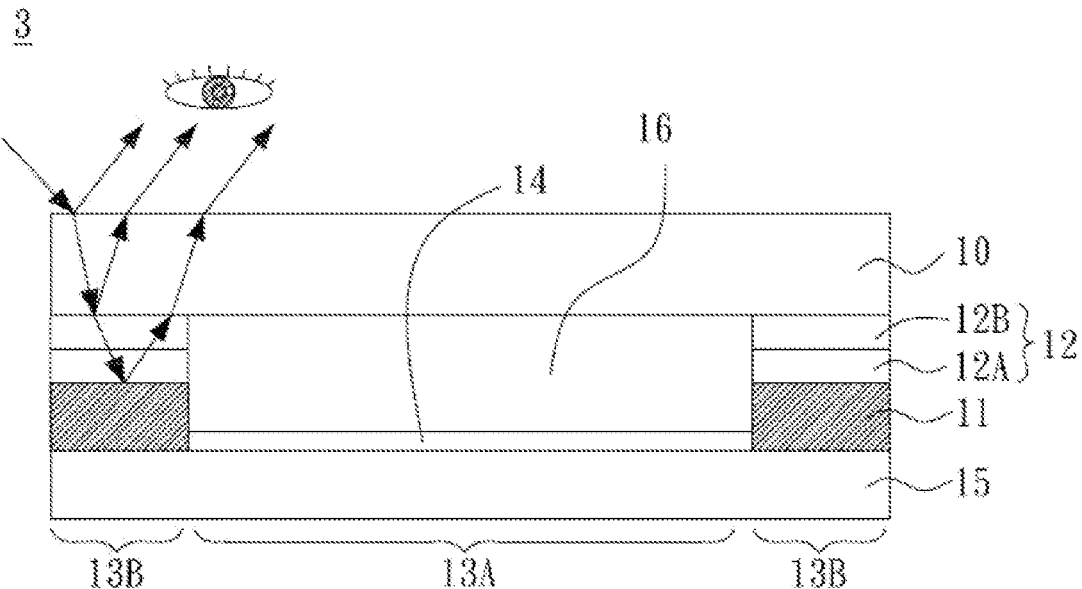

In another embodiment, sensing layer 14 is not formed plate 10 as shown in FIG. 3C. Although the structure of FIG. 3C is based on the structure of FIG. 3A, the sensing layer 14 of FIG. 3C can also be applied on the structure of FIG. 3B. In the embodiment of FIG. 3C, the touch panel 3 further includes a substrate 15, the surface of which is planned with a sensing region 13A and a conducting wire region 13B. The sensing layer 14 is disposed in the sensing region 13A, and a border 11 is disposed in the conducting wire region 13B. Moreover, lower surface of the plate 10 covers (or faces) the border 11. A smooth layer 16 is disposed between the plate 10 and the sensing layer 14. The remaining details are the same as those of the embodiment of FIG. 3A.

In this embodiment, the first refractive index layer 12A has a lower refractive index and the second refractive index layer 12B has a higher refractive index. Preferably, the first refractive index layer 12A is made of an oxide with a refractive index of about 1.38 to 1.52 such as silica (SiO2); the second refractive index layer 12B is made of an oxide or nitride with a refractive index of about 1.70 to 2.30 such as niobium pentoxide (Nb2O5), titanium dioxide (TiO2), zirconia (ZrO2) or silicon nitride (SiNx) but not limited thereto. In an example, total thickness of the optical compensation layer 12 is in the range of 10 nm to 300 nm. Stacking different refractive index layers 12A/B causes an interference of reflected light of each layer such that the final reflected light has some kind of color to achieve color diversification of the border 11.

Figure 4:
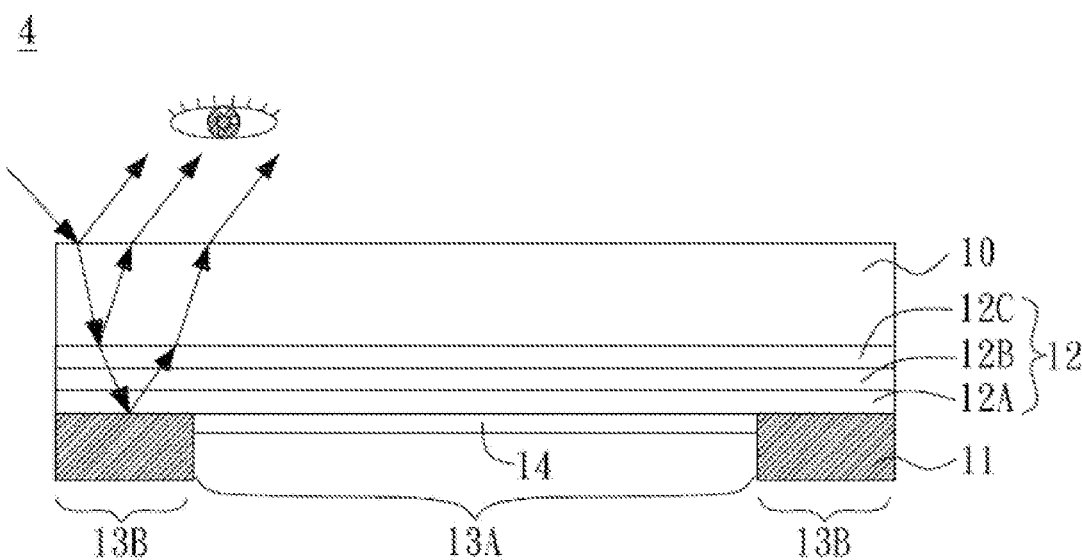
FIG. 4 illustrates a schematic sectional view of a touch panel in accordance with a fourth embodiment of the present disclosure.

FIG. 4 illustrates a touch panel 4 in accordance with a fourth embodiment of the present disclosure. Although this embodiment has been explained with reference to the structure of FIG. 3A/B, the same is also applicable to the embodiment of FIG. 3A/C. Similar to the embodiment of FIG. 3A/B, an optical compensation layer 12 of this embodiment includes a first refractive index layer 12A and it second refractive index layer 12B. The difference between the two embodiments lies in that a third refractive index layer 12C is located between the second refractive index layer 12B and a plate 10. In another embodiment, positions of the first refractive index layer 12A and the second refractive index layer 12B are swapped. Each refractive index layer 12A/B/C can be transparent. In an example, refractive index of the third refractive index layer 12C is in the range of 1.38 to about 1.52. In an example, refractive index of the third refractive index layer 12C is similar to that of the plate 10. For example, if the material of plate 10 is normal glass with a refractive index approximately equal to 1.5, material with a refractive index close to 1.5 can be chosen for the third refractive index layer 12C.

The present disclosure utilizes an optical compensation layer to adjust color of a border. In a situation of unchanging, color of the ink or photo resist, color of the border is adjusted through the structure of the optical compensation layer. Since the color of the ink or photo resist cannot be changed, higher manufacturing temperature of the subsequent manufacturing process does not cause defective products due to discoloration of dye by heat, which increases the production yield. Moreover, the optical compensation layer can make the outline of the patterned conducting layer unclear, so as to improve the appearance of the touch panel.

The foregoing descriptions are the preferred embodiments of the present disclosure only and various modifications can be made thereto without departing from the spirit and scope of the disclosure. All modifications and substitutions to the claims of the present disclosure are defined by the attached claims.

What is claimed is:

1. A touch panel with diversified color in a conducting wire region, comprising:
    a plate having an upper surface and a lower surface opposite to the upper surface, wherein the lower surface has the conducting wire region on a peripheral area of the lower surface and a sensing region surrounded by the conducting wire region;
    a border overlaid on the conducting wire region and having a fast color;
    a sensing layer disposed in the sensing region; and
    an optical compensation layer located between the plate and the border and having a transparent property;
    wherein an interference of a reflected light, of the optical compensation layer with a reflected light, of the border makes the entire reflection from the border and the optical compensation layer appear as a second color differed from the first color of the border.

2. The touch panel of claim 1, wherein the optical compensation layer is disposed on the edge of the lower surface of the plate to correspond to position of the border.

3. The touch panel of claim 1, wherein the optical compensation layer is disposed on the entire lower surface of the plate.

4. The touch panel of claim 3, wherein the sensing layer includes a region covered with a patterned conductive material and a region not covered with the patterned conductive material, and wherein the optical compensation layer within the sensing region compensates a difference between the refractive indexes of the region covered with patterned conductive material and the region not covered with the patterned conductive material.

5. The touch panel of claim 1, wherein the optical compensation layer comprises of one or more refractive index layers.

6. The touch panel of claim 5, wherein the optical compensation layer includes a first refractive index layer and a second refractive index layer, and wherein refractive index of the first refractive index layer is less than that of the second refractive index layer.

7. The touch panel of claim 6, wherein the first refractive index layer is located between the border and the second refractive index layer, and wherein the second refractive index layer is located between the plate and the first refractive index layer.

8. The touch panel of claim 7, wherein refractive index of the first refractive index layer is in the range of 1.38 to 1.52.

9. The touch panel of claim 7, wherein refractive index of the second refractive index layer is in the range of 1.70 to 2.30.

10. The touch panel of claim 7, wherein the first refractive index layer is an insulation layer, and the second refractive index layer is an insulation layer.

11. The touch panel of claim 7, wherein material of the first refractive index layer is silica.

12. The touch panel of claim 7, wherein material of the second refractive index layer is selected from the group consisting of niobium pentoxide, titanium dioxide, zirconia, and silicon nitride.

13. The touch panel of claim 7, further comprising a third refractive index layer located between the second refractive index layer and the plate, Wherein refractive index of the third refractive index layer is less than that of the second refractive index layer.

14. The touch panel of claim 13, wherein refractive index of the third refractive index layer is in the range of 1.38 to 1.52.

15. The touch panel of claim 1, wherein thickness of the optical compensation layer is in the range of 10 nm to 300 nm.

16. A touch panel with diversified color in a conducting wire region, comprising:
    a substrate having the conducting wire region on a peripheral area of the lower surface and a sensing region surrounded by the conducting wire region;
    a sensing layer disposed in the sensing region;
    a border overlaid on the conducting wire region and having a first color;

a plate having an upper surface and a lower surface opposite to the upper surface, wherein the plate is overlaid on the border; and an optical compensation layer located between the plate and the border and having a transparent property;

wherein an interference of a reflected light of the optical compensation layer with a reflected light of the border makes the entire reflection from the border and the optical compensation layer appear as a second color differed from the first color of the border.

17. The touch panel of claim 16, wherein the optical compensation layer is disposed on edge of the lower surface of the plate to correspond to position of the border.

18. The touch panel of claim 16, wherein the optical compensation layer is disposed on the entire lower surface of the plate.

19. The touch panel of claim 16, wherein the optical compensation layer comprises one or more refractive index layers.

20. The touch panel of claim 16, wherein the optical compensation layer includes a first refractive index layer and a second refractive index layer, and wherein refractive index of the first refractive index layer is less than that of the second refractive index layer.

21. The touch panel of claim 20, wherein the first refractive index layer is located between the border and the second refractive index layer, and wherein the second refractive index layer is located between the plate and the first refractive index layer.

22. The touch panel of claim 20, wherein refractive index of the first refractive index layer is in the range of 1.38 to 1.52.

23. The touch panel of claim 20, wherein refractive index of the second refractive index layer is in the range of 1.70 to 2.30.

24. The touch panel of claim 20, wherein the first refractive index layer is an insulation layer, and the second refractive index layer is an insulation layer.

25. The touch panel of claim 20, wherein material of the first refractive index layer is silica.

26. The touch panel of claim 20, wherein material of the second refractive index layer is selected from the group consisting of niobium pentoxide, titanium dioxide, zirconia, and silicon nitride.

27. The touch panel of claim 20, further comprising a third refractive index layer located between the second refractive index layer and the plate, wherein refractive index of the third refractive index layer is less than that of the second refractive index layer.

28. The touch panel of claim 27, wherein refractive index of the third refractive index layer is in the range of 1.38 to 1.52.

29. The touch panel of claim 16, wherein thickness of the optical compensation layer is in the range of 10 urn to 300 nm.

30. The touch panel of claim 16, further comprising a smooth layer disposed between the optical compensation layer and the sensing layer.

\* \* \* \* \*